United States Patent [19]

White

[11] Patent Number: 4,850,240
[45] Date of Patent: Jul. 25, 1989

[54] DETENTED SLIDE CONTROL ASSEMBLY

[75] Inventor: I. M. White, Germantown, Tenn.

[73] Assignee: Outboard Marine Corporation, Waukegan, Ill.

[21] Appl. No.: 177,339

[22] Filed: Apr. 4, 1988

[51] Int. Cl.[4] .............................................. F16C 1/10
[52] U.S. Cl. .................................... 74/500.5; 74/526; 74/527; 74/502.6; 188/82.2; 188/2 D
[58] Field of Search ............ 74/500.5, 501.5 R, 501.6, 74/502, 503, 502.4, 502.6, 526, 527, 523, 531; 188/82.2 X, 82.7, 82.8, 2 D X

[56] References Cited

U.S. PATENT DOCUMENTS

| | | | |
|---|---|---|---|
| 711,651 | 10/1902 | Andrew | 188/82.2 |
| 1,477,397 | 12/1923 | Underwood. | |
| 1,552,198 | 9/1925 | Beard. | |
| 2,591,495 | 4/1952 | Baldwin, Jr. et al. | |
| 2,850,608 | 9/1958 | Bourns et al. | 74/501.5 R X |
| 3,000,231 | 9/1961 | Cochran. | |
| 3,543,594 | 12/1970 | Berleyoung et al. | |
| 3,557,914 | 1/1971 | Tanaka | 188/82.7 X |
| 3,662,617 | 5/1972 | Bennett et al. | 74/502.4 |
| 3,744,339 | 7/1973 | Martinson | 74/500.5 |
| 3,835,726 | 9/1974 | Gregory. | |
| 4,438,658 | 3/1984 | Carlson. | |
| 4,611,502 | 9/1986 | Gregory. | |
| 4,646,206 | 2/1987 | Bauer et al. | 74/502 |
| 4,648,656 | 3/1987 | Kimura | 188/82.2 |
| 4,671,494 | 6/1987 | Makino et al. | 188/82.7 |
| 4,699,042 | 10/1987 | Stoll | 74/527 |
| 4,793,206 | 12/1988 | Suzuki | 74/501.5 R |
| 4,798,098 | 1/1989 | Keller et al. | 74/501.5 R |

FOREIGN PATENT DOCUMENTS 53-148688  12/1978  Japan ..................................... 74/527

Primary Examiner—Vinh Luong
Attorney, Agent, or Firm—John T. Synnestvedt; Richard D. Weber

[57] ABSTRACT

A slide control assembly includes a detent mechanism for providing a series of spaced set positions for the controlled device. The control setting can be changed only by first cocking the control lever in the direction of intended control movement to release the detent mechanism. An audible signal is produced by the detent mechanism to permit the operator to accurately gauge the movement of the control.

15 Claims, 2 Drawing Sheets

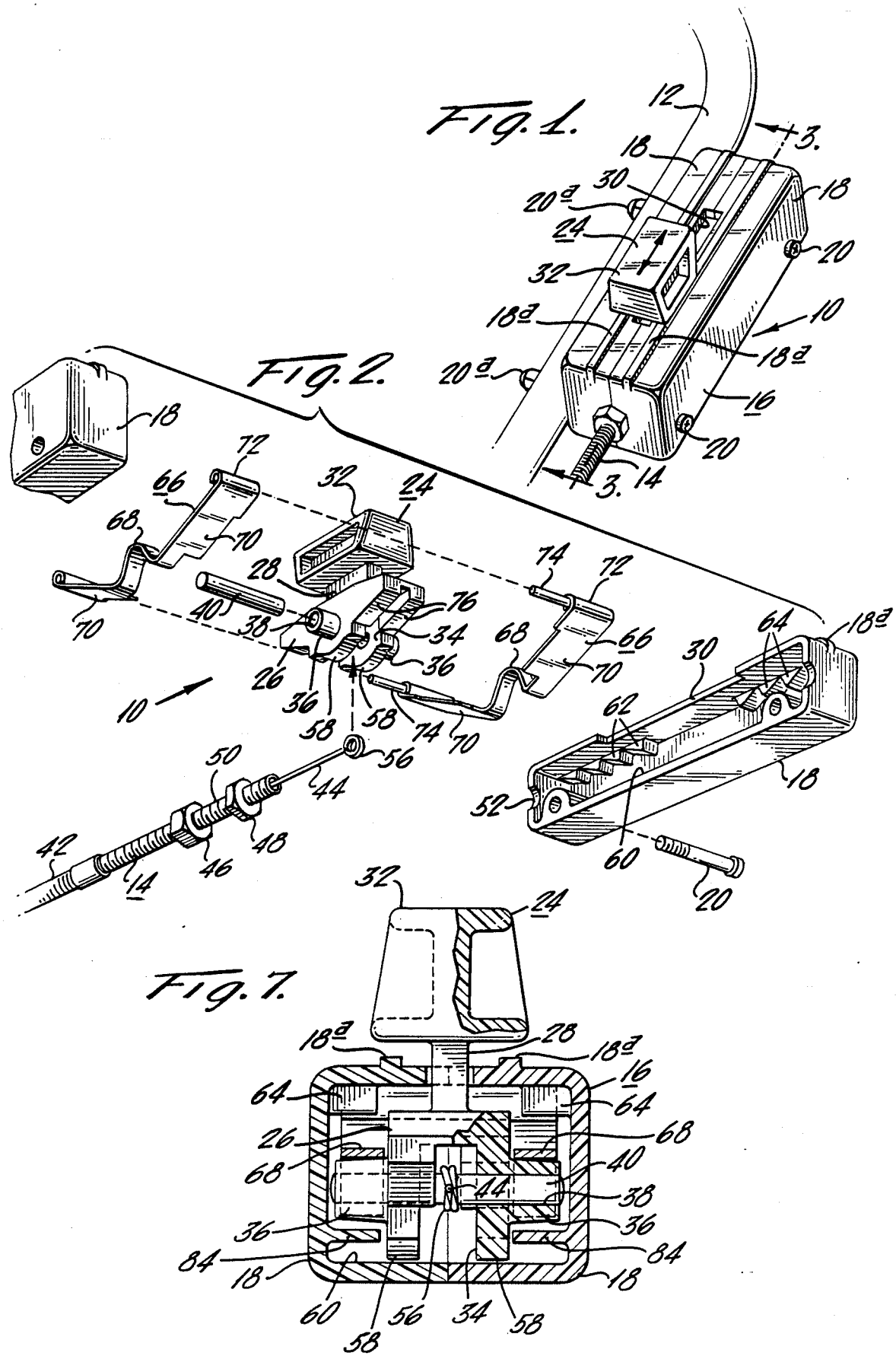

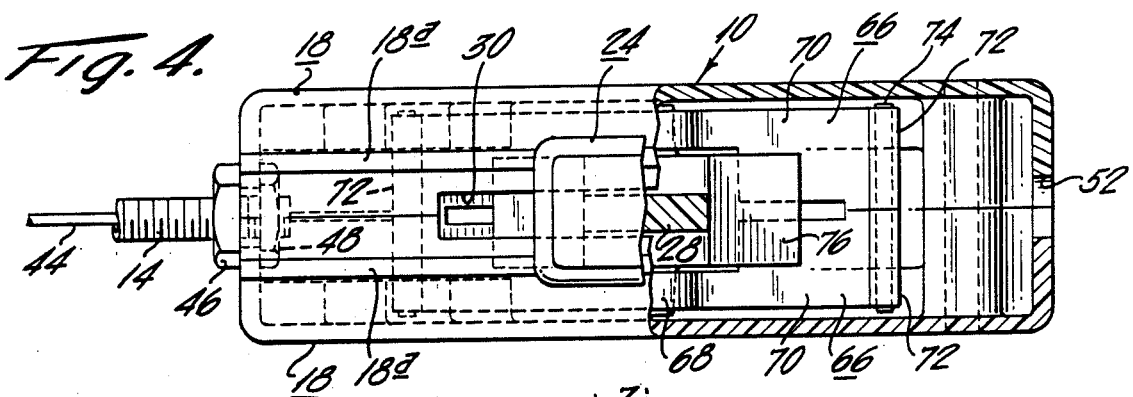

DETENTED SLIDE CONTROL ASSEMBLY

BACKGROUND OF THE INVENTION

The present invention relates generally to control mechanisms and more specifically to mechanisms for selectively establishing and maintaining the position of a control cable such as those used to control the position of small engine throttles, for example, in lawn mowers.

A variety of have been utilized prior to the present invention to control a small engine throttle cable, commonly known as a Bowden cable. These prior devices, which are usually of the linear slide type or the rotary lever type, typically provide a continuously adjustable cable setting and include some form of friction mechanism to maintain the set position after the control has been released. Although adequate for some applications, the conventional throttle control does not provide predetermined throttle setting positions, such as for engine starting, or for maintaining a preferred engine operating speed. Furthermore, a friction arrangement for holding the throttle control is not always reliable and, especially after of use subjected to the vibrations common to reciprocating engines, is subject to slippage. An unwanted change of engine speed can not only be annoying, but can pose a serious hazard, particularly if the engine should unexpectedly speed up.

Although control mechanisms have been developed which provide some form of stepped or ratchet action of the control level, such mechanisms typically either interfere with the desired ease of movement of the control, or provide inadequate control setting security. Such mechanisms suffer the further disadvantages of being complex in structure and expensive to manufacture.

SUMMARY OF THE INVENTION

In the present invention, a control mechanism is provided which in a given setting is securely locked against movement either due to vibration, forces acting through the cable, or incidental engagement of the control level. The present control not only provides a positive locking of the control cable against movement in either direction, but further requires a depression of the control level in the direction of desired movment in order to unlock the control for movement in that direction. Additionally, the control provides a loud audible signal as the control moves from one position to another, thereby informing the operator of the degree of change in position of the control.

The present control assembly includes a case of an elongated configuration and to one end of which the cable to be controlled is attached with the control wire extending interiorly into the casing. The assembly includes a control lever within the case attached to the end of the wire and longitudinally slideable within the case. A handle portion of the lever extends through a slot in the top of the case.

A series of ratchet teeth are provided in the forward and rearward portions of the case at uniformly spaced intervals, the forward teeth facing rearwardly and the rearward teeth facing forwardly. A detent spring attached to the control lever includes flat spring arms extending forwardly and rearwardly into angular engagement with the respective sets of ratchet teeth. In a set position of the control level, the ends of both spring arms are simultaneously seated in ratchet teeth, preventing movement of the control lever in either direction. In order to release the locking effect of the spring arms for movement of the control lever in a given direction, the lever must be first cocked in the intended direction of control movement to release the spring arm preventing movement in that direction from the ratchet tooth in which it is engaged. The lever may then be advanced in that direction as long as it is held in the cocked position to prevent further engagement of the spring arm. As the lever is advanced, the trailing spring arm, which is under increased spring engagement with its set of ratchet teeth, provides a loud, easily heard report as it snaps from the tip of one tooth to the beginning of the next. Upon release of the control lever, the spring arms will immediately return the lever to its vertical set position and, by engagement with the ratchet teeth, prevent any movement of the control in either direction.

It is accordingly a first object of the present invention to provide a control assembly which may be selectively actuated to establish and maintain a specific position of the controlled mechanism.

Another object of the invention is to provide a control assembly as described which will maintain its established control position despite the presence of forces transmitted from the controlled mechanism.

A further object of the invention is to provide a control assembly as described which provides an audible signal of the degree of change in control position.

Still another object of the invention is to provide a control assembly which minimizes the possibility of control movement due to inadvertent contact.

Still another object of the invention is to provide a control assembly as described having a small number of parts and which can be economically manufactured, assembled and installed.

Additional objects and advantages of the invention will be more readily apparent from the following detailed description of a preferred embodiment thereof.

BRIEF DESCRIPTION OF THE DRAWINGS

FIG. 1 is a perspective view showing a control assembly in accordance with the present invention mounted on the partially shown handle of a lawn mower;

FIG. 2 is a perspective exploded view of the control assembly shown in FIG. 1;

FIG. 3 is an enlarged side elevational view partly in section taken along line 3—3 of FIG. 1 and showing in broken lines the manner in which the control lever is cocked to free one of the spring arms;

FIG. 4 is a top view partly cut away and in section of the control assembly shown in FIGS. 1-3;

FIG. 5 is a view similar to FIG. 3 showing the control lever cocked in the forwardly advancing position and showing in broken lines the manner in which the trailing spring arm snaps along the ratchet teeth to create an audible movement indicator;

FIG. 6 is a view similar to FIGS. 3 and 5 showing the full range of movement of the control lever; and FIG. 7 is an enlarged sectional view of the control assembly taken along line 7—7 of FIG. 3.

DESCRIPTION OF THE PREFERRED EMBODIMENT

Referring to the drawings and particularly FIG. 1 thereof, a control assembly 10 in accordance with the present invention is shown mounted on the side of the partially shown tubular handle 12 of a lawn mower. The control assembly is mounted within easy reach of the lawn mower operator to permit control of a mower function, such as the engine throttle. In the illustrated embodiment, the throttle is connected to the control assembly 10 by means of a Bowden cable 14 attached to the front end of the control assembly.

As shown in FIG. 1 and the exploded view of FIG. 2, the control assembly 10 includes a case 16 which comprises a pair of identical case halves 18 which are preferably formed of a molded plastic material. The case 16 is of a generally rectangular, elongated configuration with the longitudinal case axis generally aligned with the control cable 14.

Although the control assembly is symmetrical about its longitudinal axis, thus permitting the cable to be controlled to be attached at either end of the assembly, for purposes of discussion, the end to which the cable is attached will be referred to as the front end of the case, and the other end the rear end of the case. Movements of the control mechanism will accordingly be referred to as forward and rearward movement in these respective directions.

The casing halves 18, upon assembly of the control mechanism, are joined by screws 20 passing through apertures 22 in the case halves. The joining of the case halves by the screws 20 serves to retain the internal assembly components in position. Removal of the screws permits the assembly elements to be disassembled as may be gained from the exploded view of FIG. 2. In FIG. 1, the screws 20 pass through the handle 12 and are secured thereto by nuts 20a.

Disposed within the case 16 is a control lever 24 which includes a body portion 26 disposed within the casing 16, a neck portion 28 extending upwardly through a longitudinal slot 30 in the top of the casing, and an enlarged handle portion 32 extending from the neck portion and providing a means for manually operating the control mechanism. The body portion 26, as shown in FIG. 7, is substantially rectangular in section and includes a central longitudinal slot 34 therein. Cylindrical shoulders 36 extend from each side of the body portion 26 and a transverse bore 38 extending concentrically through the shoulders 36 receives a transverse pin 40.

The control cable 14 as shown in FIG. 2 includes an outer casing 42 of wrapped wire and an inner control wire 44 which is slideable within the casing. Mounting nuts 46 and 48 on a threaded terminal portion 50 of the cable permit attachment of the cable casing through an aperture 52 in the front end 54 of the casing. A loop 56 in the end of the wire 44 is engaged by the pin 40 as shown for example in FIGS. 3 and 7 to provide a pivotal connection of the wire to the control lever 24.

The lower end 58 of the control lever 24 is shaped in an arcuate configuration to permit sliding movement on the floor 60 of the case 16 and also to permit a cocking movement of the control lever for a purpose to be presently explained. To permit such cocking movement, the enlarged handle portion 32 of the lever is spaced above the top of the casing in the normal perpendicular position of the lever with respect to the casing.

Detent means mounted on the control lever 24 are provided to cooperatively engage front and rear sets of ratchet teeth 62 and 64 extending downwardly from the top wall of each casing half 18. The teeth of the front set of ratchet teeth 62 are directed rearwardly, while the teeth of the rear set of ratchet teeth 64 of each casing half are directed forwardly.

The detent means which cooperatively engage the ratchet teeth comprises a pair of substantially identical spring elements 66 preferably formed of a flat spring metal. The spring elements 66, which are configured in the form of a flat W, each include a central arcuate portion 68 adapted to seat on one of the cylindrical shoulders 36 of the control lever 24, and spring arms 70 extending longitudinally from body sides of the arcuate portion 68. The ends 72 of the spring arms 70 are rolled back to form a socket for pins 74 which join the opposing spring elements to ensure a unitary action of the detent means. As may be seen for example in FIG. 3, the ends 72 of the spring arms engage the ratchet teeth 62 and 64 in a given position of the control lever and, due to the engagement of the central portions 68 of the spring elements with the shoulders 36 of the lever, positively lock the lever in a set position against either forward or rearward movement. The angled disposition of the spring arms coupled with the rearward inclination of the forward ratchet teeth and the forward inclination of the rearward ratchet teeth contribute to this positive locking effect. Without some releasing mechanism, the control lever could not be moved within the casing.

The release mechanism for the spring arms comprises forwardly and rearwardly extending portions of the control lever which engage the spring arms 70 upon a cocking movement of the lever in the direction of intended sliding lever movement. Specifically, the release mechanism includes beveled surfaces 76 of the control lever which engage the upper surfaces of the spring arms and extend approximately half the length of the spring arms. As shown in FIG. 3, a cocking movement of the control lever 24 will serve to depress the spring arms of the detent means extending in the direction in which the lever is cocked and accordingly release the spring arm ends from the ratchet teeth, thus allowing sliding movement of the control lever in that direction. In FIG. 3, the control lever is unlocked for forward motion by cocking or rotating the lever through the angle a, thus displacing the lever and the forward spring arm into the broken line position 24' and 70' respectively. This cocking of the control lever frees the forwardly directed spring arms from the ratchet teeth 62 and permits forward movement of the control lever as long as the control lever remains in a forwardly cocked disposition. The degree of movement of the lever can be audibly gauged by means of the loud snapping noise caused as shown in FIG. 5 by the spring biased movement of the trailing spring arm end from the position shown in dotted lines at 76 at the tip of a ratchet tooth to the position 78 at the start of the next tooth. The sharp impact of the spring arm against the next tooth creates a loud report as schematically indicated by the wave front 80 in FIG. 5. Upon release of the control lever, the spring arms will spring the lever to its erect position, engaging the spring arm ends with the juxtaposed ratchet teeth as shown in FIG. 6 in solid lines. As previously mentioned, the attachment of the wire 44 to the control lever by means of the pin 40 results in a movement of the control wire which is commensurate with the movement of the control lever.

The rearwardmovement of the control lever and hence the control wire 44 is accomplished in exactly the same manner as the forward movement. As shown in FIG. 6, the control lever is cocked in a rearward direction through the angle b to release the rearwardly extending spring arms from the ratched teeth 64. The control lever in the cocked position may then be slid along the case to the desired setting, the amount of movement being gauged by the audible signals produced by the trailing forwardly directed spring arms as they traverse the ratched teeth 62. The full range of movement of the lever 24 and hence the control wire is illustrated in FIG. 6 and represented by the distance d between the forwardmost solid line position of the control lever and the rearward most position 82 shown in broken lines. In the illustrated embodiment, the control lever may be set at five different positions as established by the number of ratchet teeth, the pitch of the teeth and the length of the case. Obviously, a larger number of teeth could be provided or the pitch or length of the case could be changed to produce the desired spacing between adjacent locking positions of the lever.

For ease in assembly of the control elements, a longitudinally extending rib 84 is provided on the sidewall of each case half 18 and permits the spring elements 66 to be set in place in each case half prior to introduction of the control lever. The control lever, with the wire 44 connected thereto by means of pin 40, is then introduced into one of the casing halves with the shoulder 36 thereof applying additional tension to the spring element 66. With the nut 48 in the appropriate position on the cable end 50, the cable end is placed within the aperture 52 of the casing half and the opposite casing half with its spring element 66 positioned therein is joined to capture the assembly elements in the illustrated position. The pins 74 join the oposing spring elements 66 together so they act in a cooperative manner. The pin 40 as well as the pins 74 are captured between the case halves and cannot become dislodged. Upon joining of the case halves, the nut 46 on the cable portion 50 is tightened to lock the cable in position on the control assembly.

In the preferred embodiment, the case and detent means are provided as paired elements to simplify manufacture and assembly. Such construction is not essential, and the case as well as the detent springs could be modified while retaining the basic elements and function of the mechanism. The detent means might, for example, comprise separate front and rear spring arms separately attached to the control lever.

To prevent undue wear of the top of the case, raised rails 18a may be provided for engagement by the handle portion of the lever during cocking and sliing movement of the lever. These rails serve to minimize both wear and friction between the lever handle and case.

Although the preferred embodiment of the invention shows the sliding movement of the control lever to be linear, it will be apparent that some curvature in the case and control lever movement could be employed without changing the basic structure or mode of operation of the control assembly.

From the foregoing, it will be apparent that the control lever cannot be moved by input forces from the cable wire 44 in either direction, whether such forces are the result of a spring in the throttle linkage or due to vibration. Furthermore, the need to cock the control lever handle in the intended direction of control lever movement to release the spring arms minimizes the possibility of an inadvertent throttle movement by accidental contact by the operator or engagement with bushes or trees. The mechanism accordingly provides a safety function by guarding against inadvertent throttle changes, and particularly throttle advances. When a throttle change is desired, the degree of change can be readily ascertained from the audible signal provided as each available setting position is reached. Control movements are thus quite precise and an established position is automatically locked upon release of the control lever.

Manifestly, changes in details of construction can be effected by those skilled in the art without departing from the invention.

I claim:

1. A slide control assembly comprising an elongated case having front and rear ends, a control lever disposed in said case for sliding longitudinal movement therewithin between said case ends and adapted for the connection of a control wire thereto, a handle portion of said control lever extending from said case to provide selective movement of said control lever, a series of longitudinally spaced ratchet teeth within said casing, detent means on said control lever for cooperative engagement with said ratchet teeth, said detent means comprising spring arms extending forwardly and rearwardly from said control lever, the free ends of said spring arms engaging said ratchet teeth to prevent movement of said control lever, and means on said control lever for selectively disengaging the ends of the spring arms extending in the direction of intended movement of said lever from the ratchet teeth upon the cocking of said lever in the intended movement direction, thereby permitting sliding movement of the lever in that direction.

2. The invention as claimed in claim 1, wherein said ratchet teeth comprise front and rear sets of ratchet teeth, the front teeth set being directed rearwardly, and the rear tooth set being directed forwardly to ensure a locking engagement by said spring arms ends.

3. The invention as claimed in claim 1, wherein said case provides a surface for engagement by the lower end of said control lever to support arcuate and linear sliding motion of said lever.

4. The invention as claimed in claim 3, wherein the lower end of said control lever comprises an arcuate surface for engagement with said case surface.

5. The invention as claimed in claim 1, wherein said means on said control lever for selectively disengaging the ends of said spring arms comprises forwardly and rearwardly extending portions of said lever disposed adjacent said spring arms for engagement therewith upon cocking of said lever.

6. The invention as claimed in claim 1, wherein said detent means comprises a spring element configured in the shape of a flat W.

7. The invention as claimed in claim 1, wherein said spring arms are spring loaded within the case to bias said control lever to a locked position.

8. A slide control assembly comprising an elongated case having front and rear ends, said case comprising longitudinally divided case halves of identical construction, a control lever disposed in said case for sliding longitudinal movement therewithin between said case ends, means for attachment of a control cable to an end of said case, said control lever being adapted for the connection of the end of the control wire of said cable thereto, a handle portion of said control lever extending from said case to provide selective movement of said control lever, a series of longitudinally spaced ratchet teeth within each said case halves, detent means on said control lever for cooperative engagement with said ratchet teeth, said detent means comprising a pair of detent elements disposed in juxtaposed relation at each side of said lever, each said detent element comprising spring arms extending forwardly and rearwardly from said control lever, the free ends of said spring arms engaging said ratchet teeth to prevent movement of said control lever, and means on said control lever for selectively disengaging the ends of the spring arms extending in the direction of intended movement of said lever from the ratchet teeth upon the cocking of said lever in the intended movement direction, thereby permitting sliding movement of the lever in that direction.

9. The invention as claimed in claim 8, including means connecting the ends of the detent elements to provide a unitary action of said pair of elements.

10. The invention as claimed in claim 8, wherein said ratchet teeth comprise front and rear sets of ratchet teeth in each said case half, the front tooth set of each case half being directed rearwardly, and the rear tooth set of each case half being directed forwardly to ensure a locking engagement by said spring arm ends.

11. The invention as claimed in claim 8, wherein said case provides a surface for engagement by the lower end of said control lever to support arcuate and linear sliding motion of said lever.

12. The invention as claimed in claim 8, wherein the lower end of said control lever comprises an arcuate surface for engagement with said case surface.

13. The invention as claimed in claim 8, wherein said means on said control lever for selectively disengaging the ends of said spring arms comprises forwardly and rearwardly extending portions of said lever disposed adjacent said spring arms for engagement therewith upon cocking of said lever.

14. The invention as claimed in claim 8, wherein said detent means comprises a spring element configured in the shape of a flat W.

15. The invention as claimed in claim 8, wherein said spring arms are spring loaded within the case to bias said control lever to a locked position.

* * * * *

UNITED STATES PATENT AND TRADEMARK OFFICE
CERTIFICATE OF CORRECTION

PATENT NO. : 4,850,240
DATED : July 25, 1989
INVENTOR(S) : I. M. White

It is certified that error appears in the above-identified patent and that said Letters Patent is hereby corrected as shown below:

Column 1, line 42, change "level" to --lever--.

Column 1, line 45, change "level" to --lever--.

Column 1, line 45, change "movment" to --movement--.

Column 1, line 66, change "level" to --lever--.

Column 4, line 8, change "body" to --both--.

Column 4, line 67, change "ratched" to --ratchet--.

Column 5, line 4, change "ratched" to --ratchet--.

Column 5, line 29, change "oposing" to --opposing--.

Column 5, line 46, change "sliing" to --sliding--.

Column 6, line 31, change "teeth" (second occurrence) to --tooth--.

Signed and Sealed this

Twelfth Day of June, 1990

Attest:

HARRY F. MANBECK, JR.

*Attesting Officer*  *Commissioner of Patents and Trademarks*